Aug. 4, 1942.  R. H. WAGER  2,291,776
COMBINED SMOKE OBSERVATION DEVICE AND PHOTO-ELECTRIC INDICATING MEANS
Filed Jan. 16, 1941  4 Sheets-Sheet 1

WITNESS
H. Woodard

Inventor
R. H. Wager
By H. Q. Willson & Co
Attorneys

Aug. 4, 1942.   R. H. WAGER   2,291,776
COMBINED SMOKE OBSERVATION DEVICE AND PHOTO-ELECTRIC INDICATING MEANS
Filed Jan. 16, 1941   4 Sheets-Sheet 2

Inventor
R. H. Wager

Aug. 4, 1942.  R. H. WAGER  2,291,776
COMBINED SMOKE OBSERVATION DEVICE AND PHOTO-ELECTRIC INDICATING MEANS
Filed Jan. 16, 1941 4 Sheets-Sheet 3

WITNESS
H. Woodard

Inventor
R. H. Wager
By H. R. Willson & Co.
Attorneys

Aug. 4, 1942.     R. H. WAGER     2,291,776
COMBINED SMOKE OBSERVATION DEVICE AND PHOTO-ELECTRIC INDICATING MEANS
Filed Jan. 16, 1941     4 Sheets-Sheet 4
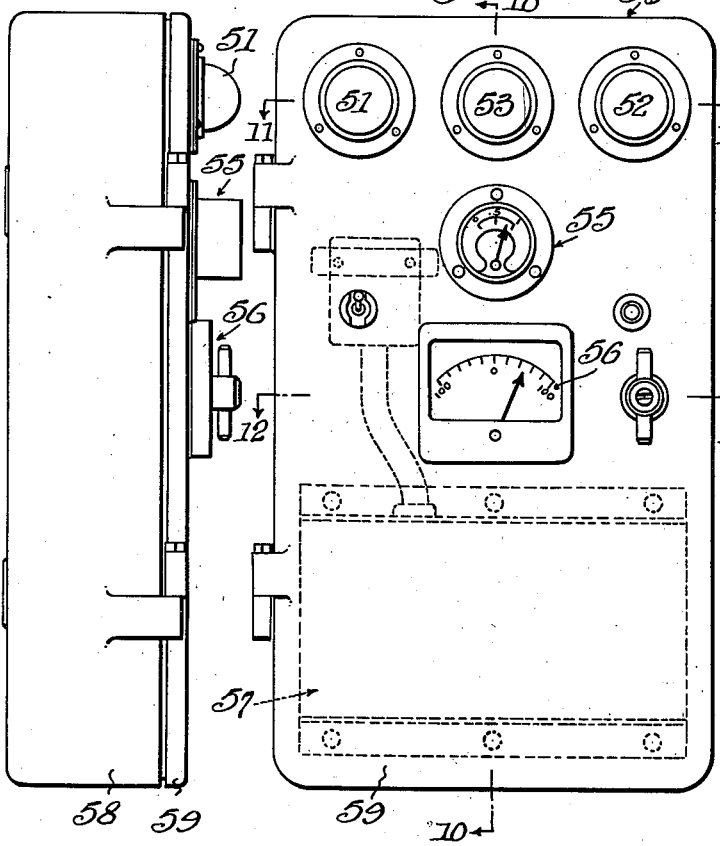
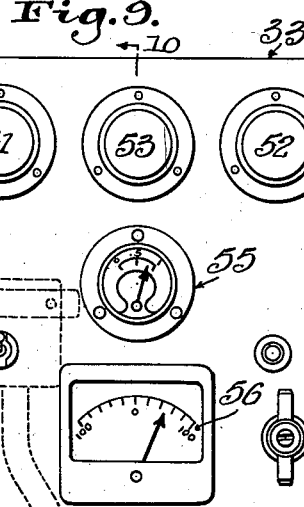
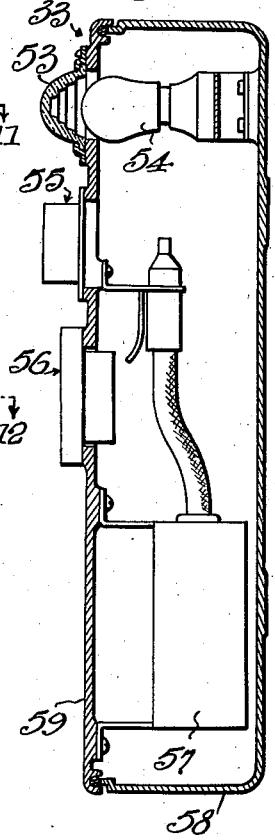
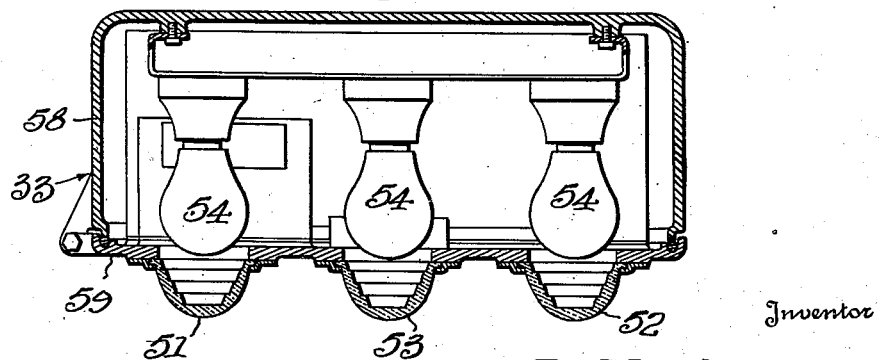
Inventor
R. H. Wager
WITNESS
H. Woodard
By
H. R. Wilson &Co
Attorneys Patented Aug. 4, 1942

2,291,776

UNITED STATES PATENT OFFICE 2,291,776

COMBINED SMOKE OBSERVATION DEVICE AND PHOTOELECTRIC INDICATING MEANS

Robert Hudson Wager, Maplewood, N. J.

Application January 16, 1941, Serial No. 374,751

6 Claims. (Cl. 88—14)

For many years, devices have been in use for visually inspecting the condition of smoke discharged from various kinds of furnaces and boilers to thereby determine whether the most efficient combustion is taking place. Most of these devices have included means for projecting a beam of light across the stack or some other smoke passage, and reflecting means for receiving the light beam and reflecting it directly to an observation station or to other reflecting means which in turn reflect it on to such a station. In other devices, electrical indicators have been provided, controlled by light-sensitive elements for showing the condition of the discharging smoke.

A single device embodying the visual observation and the electrical indication features both utilizing the same light beam would be highly desirable and my invention aims to provide such a device.

In carrying out the above end, a further object is to provide a combined visual and electrical device in which the light sensitive signal control element, even though controlled by the same beam of light which is received and reflected by the reflecting means, will not obstruct said beam and will cast no shadow on said reflecting means.

A further object is to provide a novel construction which will thoroughly encase and protect the light-sensitive element.

Yet another object is to provide a novel construction in which both the reflecting means and the light-sensitive element are carried by a single housing door which may be easily substituted for the housing door 19 of my U. S. Patent 1,708,987 of April 16, 1929, covering a Smoke inspection device which has been successfully marketed for a number of years.

A still further aim is to provide a novel construction which, while designed primarily for smoke condition observation and indication purposes, will not necessarily be limited to this field, but will be useable to advantage in other installations where it is desirable to combine, with a light-reflecting optical device, a light-sensitive work-performing element, in such manner that only one beam of light is required for both observation and for control of said light-sensitive element.

With the foregoing in view, the invention resides in the novel subject matter hereinafter described and claimed, description being accomplished by reference to the accompanying drawings.

Fig. 6 is a rear elevation of the reflecting mirror shown more particularly in Figs. 2 and 4.

Fig. 7 is an exaggerated horizontal sectional view on line 7—7 of Fig. 6.

Fig. 8 is a side elevation of the indicating means.

Fig. 9 is a front elevation thereof.

Figs. 10, 11 and 12 are sectional views on the correspondingly numbered broken lines of Fig. 9.

Figure 1:
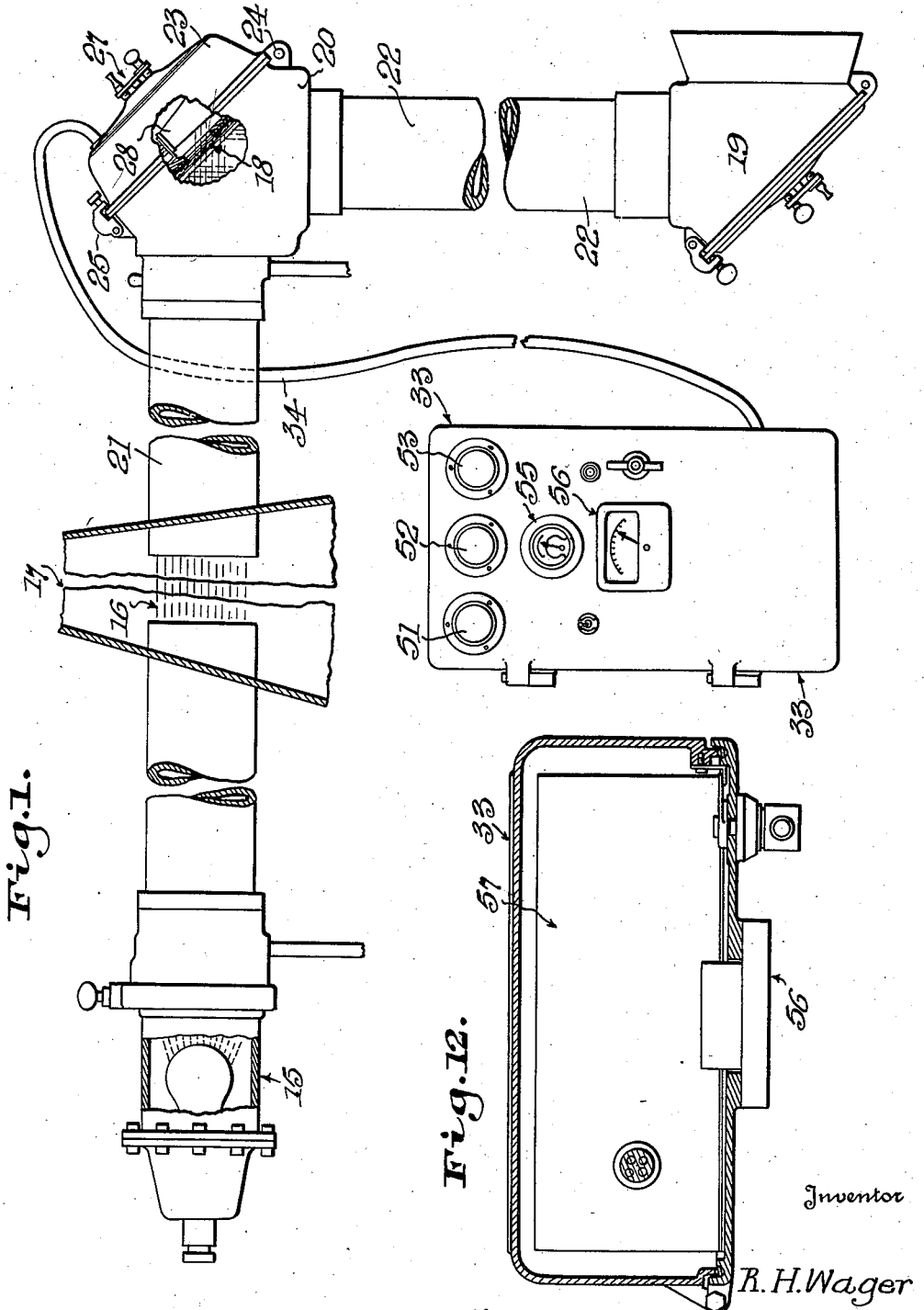
Figure 1 is a vertical sectional view partly broken away and in section showing the invention operatively associated with a smoke passage.

Insofar as the visual characteristics of the disclosed device are concerned, it is very similar to the device disclosed in my Patent 1,708,987, above mentioned, and another of my patents No. 2,118,716 of May 24, 1938, also disclosing a smoke inspection device. For structural details, herein shown but not described, reference may be made to said patents. Furthermore, with reference to structural features which are described herein, it is to be understood that while they are preferred, variations may be made within the scope of the invention as claimed.

A light-projecting unit 15 is shown for projecting a beam of light 16 across a smoke passage 17, and a mirror 18 is shown to receive said beam of light and reflect same to an observation station 19. The mirror 18 is disposed within a housing 20 having a light inlet connected with the passage 17 by an appropriate pipe 21, said housing 20 also having a light outlet connected with the observation station 19 by means of a pipe 22. A door 23 is provided for the housing 20, said door being disposed at 45° to the pipes 21 and 22, being hinged at 24 for outward swinging and being provided with appropriate fastening means 25 for normally holding it tightly closed. Within this housing 20 is a casing 26 having the mirror 18 at one of its sides, said casing, while ordinarily being disposed in a plane at an angle of 45° to the pipes 21 and 22, being universally adjustable to compensate for any irregularities due to installation or to warping of parts after installation. The universal adjusting means for the casing 26 is indicated at 27. This adjusting means is in all substantial respects a duplicate of the mirror-adjusting means disclosed in the two patents above mentioned.

Within the casing 26, behind the mirror 18, is an electrical light-sensitive element 28 customarily known as a photo-tube, a tube identified to the trade as RCA No. 919 being preferably employed. Also within the casing 26, I have disclosed an amplifying tube 29, RCA #6J7G being preferred. A coil 30 and suitable condensers 31 and 32 are also shown within the casing 26, these elements and the tubes 28 and 29 forming portions of a photo-electric indicating means, the indicating unit of which is disclosed at 33, said unit being appropriately connected with the elements within the casing 26 by means of a suitable cable 34. This cable passes through a grommet 35 in the door 23 and through a stuffing box 36 carried by the casing 26, said stuffing box preventing any entrance of moisture and foreign matter around said cable.

The mirror 18 is provided with a non-reflecting portion 37 through which a sample of the light beam 16 may pass to the photo-tube 28, said portion 37 being very restricted so as to not materially interfere with the reflecting surface of the mirror. In the preferred construction, this restricted portion 37 of the mirror 18 is provided as described below.

The mirror comprises the usual transparent plate 38 with a light-reflecting backing 39 of silver or the like, said backing being provided with a narrow vertically elongated slot 40 through which the beam sample may pass to the photo-tube 28.

The elements 28, 29 and 30 above described, are preferably mounted on a single bracket 41 secured by screws or the like 42 to a plate 43, which plate is in turn secured to the body of the casing 26 by screws or the like 44, said plate 43 closing the open side of said casing body and cooperating with the latter in forming the complete casing. A moisture-excluding gasket 45 is preferably interposed between the casing body and the plate 43, as shown. This plate is of course formed with an opening 46 alined with the slot 40. Also the usual mirror backing sheet 47 which lies against the plate 43, is formed with a similar opening 48. The outer ends of the screws 44 secure a frame 49 to the casing body, which frame secures the mirror 18 in place. A gasket or the like 50 is shown between the frame 49 and the mirror to prevent breaking of the latter when the screws 44 are tightened.

When the invention is properly installed, the beam of light from the projector 15 will pass across the smoke passage 17, will be received by the mirror 18 and will be reflected on to the observation station 19 at which the condition of the smoke may be seen. At the same time, a sample of the same beam passes through the non-reflecting portion 37 of the mirror and so affects the photo-tube 28 as to control the indicating unit 33, which unit indicates the condition of the smoke by suitable instruments and lights.

Figure 2:
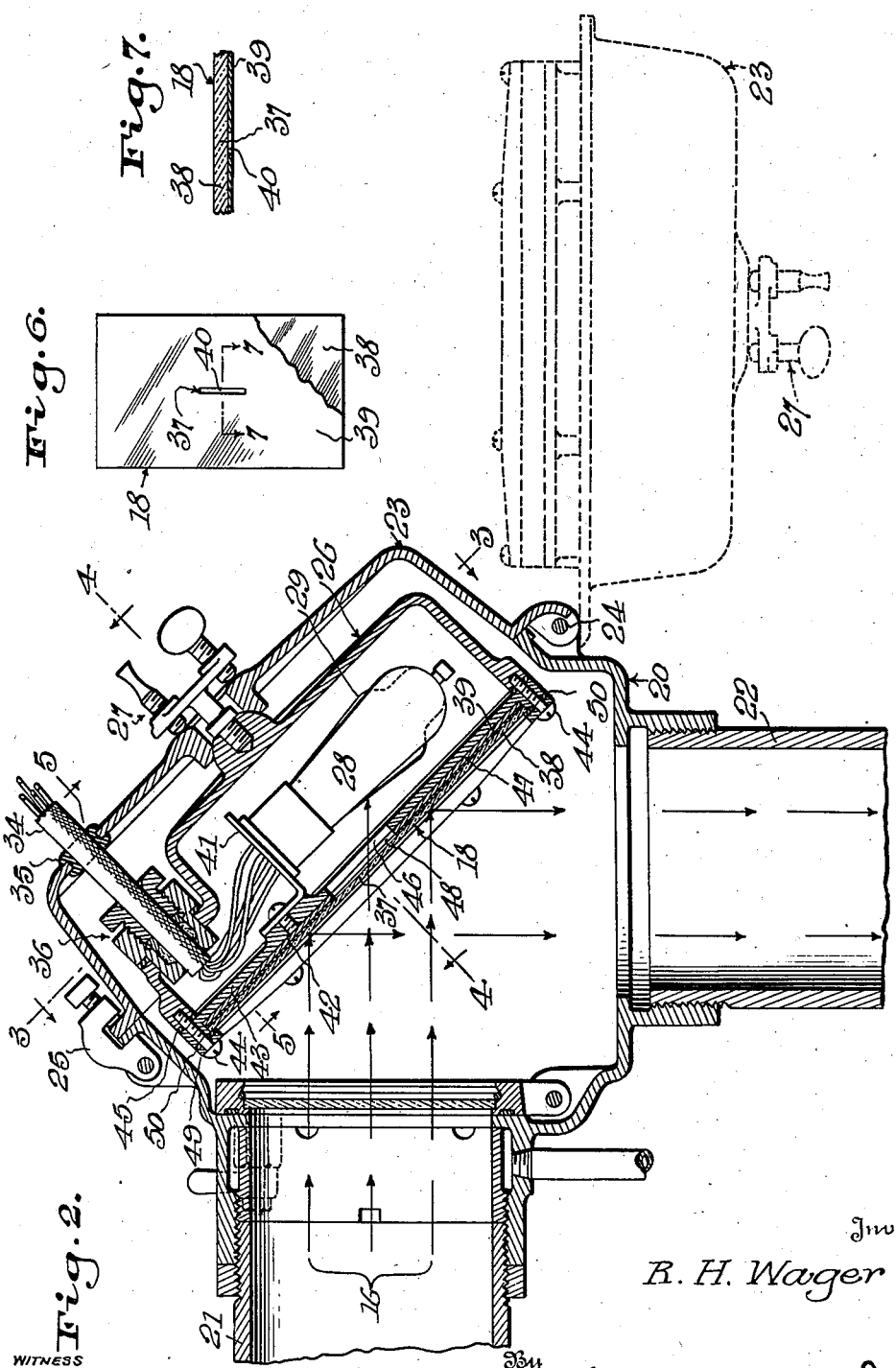
Fig. 2 is an enlarged vertical sectional view through the structure shown at the upper right hand corner of Fig. 1.
Figure 3:
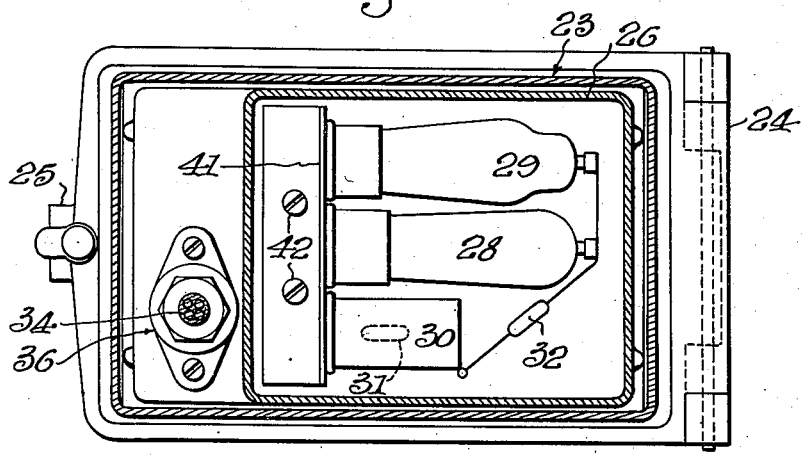
Figs. 3, 4 and 5 are sectional views on the correspondingly numbered broken lines of Fig. 2.
Figure 4:
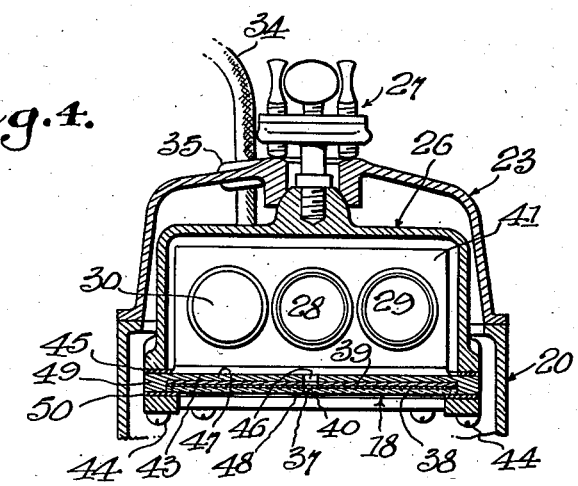
Figure 5:
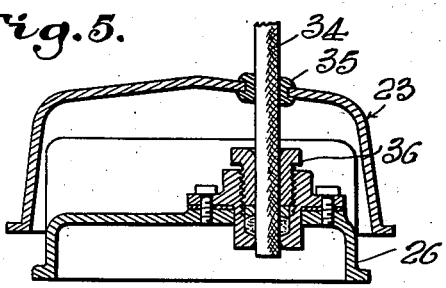

The door 23 and the parts carried thereby may readily be substituted for the mirror-carrying door 19 shown in Patent No. 1,708,987, or for the door 50 shown in Patent No. 2,118,716, and thus smoke inspection devices installed prior to the present improvements may be quickly and easily equipped with said improvements. The casing 26 effectively protects all encased parts against moisture and any foreign matter. Whenever the door 23 is swung outwardly, the casing 26 and parts carried thereby move bodily with said door as shown in dotted lines in Fig. 2. Thus, when outwardly swinging the door to clean the face of the mirror 18, its non-reflecting light-passing portion 37 may also be cleaned at the same operation. The casing 26 may be adjusted as required when initially installing and at any required time thereafter, and regardless of these adjustments to properly position the mirror with respect to the light inlet and light outlet of the housing 20, the photo-tube 28 will remain in such position as to be adequately affected by the light beam sample received thereby.

The indicating unit 33 preferably includes a red bull's eye 51 to indicate excessive smoke, a green bull's eye 52 to indicate excessive air, and a white bull's eye 53 to indicate the proper combustion conditions. Electric lights 54 are provided for these bull's eyes, and switches for these lights are controlled by an ammeter-relay 55 which is in turn controlled by a meter 56 which indicates the amount of light received on the photo-unit or tube 28 and, therefore, is a direct measure of the amount of smoke or haze present in the smoke passage 17. 57 merely denotes appropriate amplifying means.

All of the elements of the indicating unit 33 are disposed within an appropriate housing 58 having a suitable door 59 sealed against entrance of moisture and foreign matter.

From the foregoing taken in connection with the accompanying drawings, it will be seen that novel and advantageous provision has been made for carrying out the above objects, and while preferred structural features have been illustrated, attention is again invited to the possibility of making variations within the scope of the invention as claimed.

I claim:

1. In a smoke inspection device having means for projecting a beam of light across a smoke passage, and a mirror for receiving said beam and reflecting same toward an observation station; a light-sensitive smoke-indicator-control-element mounted behind said mirror, said mirror having an entirely unobstructed non-reflecting portion through which a sample of the light beam may pass without diminution to said light-sensitive element.

2. In a smoke inspection device having means for projecting a beam of light across a smoke passage, and a conventional mirror positioned to receive the beam and reflect same to an observation station, said mirror comprising a transparent plate and a light-reflecting coating on the rear side of said plate; a light-sensitive smoke-indicator-control-element mounted behind said mirror, said light-reflecting coating having a restricted opening providing said transparent plate with an entirely unobstructed portion through which a sample of the light beam may pass without diminution to said light-sensitive element.

3. In an optical device, a housing having a door, a light inlet and a light outlet, a mirror carried by and spaced inwardly from said door in position to receive a light beam entering through said inlet and to reflect said beam through said outlet, and a light-sensitive work-performing element carried by said door and located between the same and said mirror, said mirror having a restricted non-reflecting entirely unobstructed portion through which a sample of said light beam may pass without diminution to said light-senstive element; said door, mirror and element being bodily movable outwardly from said housing to permit cleaning of the face of said mirror and said restricted non-reflecting portion of said mirror.

4. In an optical device, a housing having a door, a light inlet and a light outlet, a casing and means adjustably mounting the same on the inner side of said door, said casing having a mirror at one of its sides positioned to receive a light beam entering through said light inlet and to reflect said light beam through said light outlet, and a light-sensitive work-performing element mounted in said casing behind said mirror, said mirror having a restricted entirely unobstructed non-reflecting portion through which a sample of said light beam may pass without diminution to said light-sensitive element, said door and casing being outwardly movable bodily from said housing to permit cleaning of the face of said mirror and said restricted non-reflecting portion of said mirror.

5. In a device of the class described, a casing body having an open side, a rigid plate closing said open side and having an opening, a mirror backing lying against the outer side of said plate and having an opening registering with said opening of said plate, a mirror comprising a transparent plate having a light-reflecting coating lying against said mirror backing, said coating having a restricted opening alined with the aforesaid openings to admit rays of light into the casing, means securing said mirror, backing and plate to said casing body, and a light-sensitive element mounted in said casing on said plate and disposed in the path of the admitted light rays.

6. In a device of the class described, a casing body having an open side, a rigid plate closing said open side and having an opening, a mirror at the outer side of said rigid plate and comprising a transparent plate having a light-reflecting coating on its rear side, said coating having a restricted opening alined with the aforesaid opening of said plate to admit rays of light into the casing, means securing said mirror and plate to said casing body, and a light-sensitive element mounted in said casing on said plate and disposed in the path of the admitted light rays.

ROBERT HUDSON WAGER.